(12) United States Patent
Hall et al.

(10) Patent No.: US 7,876,644 B2
(45) Date of Patent: Jan. 25, 2011

(54) POLARIZATON DIVERSITY FOR OPTICAL FIBER APPLICATIONS

(75) Inventors: David B. Hall, La Crescenta, CA (US); Paul L. Greene, La Crescenta, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 0 days.

(21) Appl. No.: 12/454,115

(22) Filed: May 13, 2009

(65) Prior Publication Data
US 2009/0263136 A1    Oct. 22, 2009

(51) Int. Cl.
*G01V 1/22*    (2006.01)
*H04B 10/12*    (2006.01)
(52) U.S. Cl. .......................... 367/76; 367/149; 398/152
(58) Field of Classification Search .................. 367/20, 367/76, 149; 398/152
See application file for complete search history.

(56) References Cited

U.S. PATENT DOCUMENTS 5,127,066 A * 6/1992 Poggiolini .................... 385/24
5,140,453 A * 8/1992 Tsushima et al. ........... 398/205

FOREIGN PATENT DOCUMENTS

EP    0175026 A1 *   3/1985
GB    2199713 A *   7/1988

* cited by examiner

*Primary Examiner*—Ian J Lobo
(74) *Attorney, Agent, or Firm*—Carmen Patti Law Group, LLC

(57) ABSTRACT

At least two light beams with polarization diversity are generated that each carry a representation of the same information. Separate optic fibers carry each of the at least two beams through a region subject to vibration to a remote location where the information is recovered by an optical receiver based on the separate light beams. Using separate fibers to carry polarization diverse information minimizes polarization noise at the optical receiver due to vibration of the fibers.

6 Claims, 2 Drawing Sheets

POLARIZATON DIVERSITY FOR OPTICAL FIBER APPLICATIONS

TECHNICAL FIELD

The invention relates generally to optical signal transmission and is particularly, but not exclusively, suited for systems where phase information is transmitted over an optical cable to a remotely located optical receiver where the optical cable is subject to vibration due to the external environment.

BACKGROUND

Optical cable (fiber) is utilized in a variety of applications to carry information that is modulated onto a beam of light. In some applications significant portions of the optical cable are in an environment where the optical cable is not normally subjected to substantial physical vibration. In other applications optical cable is utilized to carry information between two locations where the optical cable is subject to substantial movement, flexing or vibration.

FIG. 1 illustrates an example of an application where the optical cable 10 is subject to substantial movement. In this application phase information is transmitted from a towed array 12 of acoustic sensors towed behind a watercraft 14 to an optical receiver 16 in the watercraft. An optical sensor 18 may use a Mach-Zehnder interferometer as described in U.S. Pat. No. 5,448,058 and incorporated herein by reference. One or more light beams carrying the sensed information are transmitted to the optical receiver by one or more optic fibers in optical cable 10. A light source, e.g. a laser, is associated with the receiver 16 and transmits a light beam on one fiber of the cable 10 as an input to the sensor which is typically a passive device such as an interferometer. Another cable 20, e.g. a steel cable, absorbs the forces required to pull the sensor array through the water. In this environment the optical cable experiences substantial physical movement, i.e. low-frequency vibration typically below 50 hertz known as tow cable strum.

Movement of an optical cable carrying information encoded on a light beam can give rise to a change in the state of polarization of the transmitted light. Unwanted changes in the state of polarization of the transmitted light such as due to tow cable strum are manifest as polarization noise at the optical receiver.

Polarization diversity detection has been utilized in an optical receiver to overcome polarization fading. The desired signal can disappear at the optical receiver due to polarization fading such as when the two light beams in a Mach-Zehnder interferometer are orthogonal. A polarization diversity receiver is described in U.S. Pat. No. 5,852,507, which is incorporated herein by reference. Polarization optics or masks have been employed at the receiver adjacent to the detector elements to achieve polarization diversity reception.

However, rapidly changing states of polarization of the transmitted light, such as due to tow cable strum, can create sufficient polarization noise at the receiver to substantially impair the detection of the transmitted optical signal. Polarization masks or shifters used at the receiver prior to signal detection are useful in helping to eliminate signal fading due to polarization crossing but also induce unwanted polarization noise at the receiver when the light beam carrying the signal is subjected to undesired changes of polarization state. Thus, there exists a need for an improved optical system that can take advantage of polarization diversity while minimizing difficulties with polarization noise.

SUMMARY

It is an object of the invention to provide a solution that substantially satisfies this need.

The invention in one implementation encompasses an apparatus. The apparatus includes at least one polarization beamsplitter that receives as an input a single light beam carrying sensor information and produces two light beams with polarization diversity. These two beams each carry sensor information contained in the single originating light beam. This apparatus is located at or near the point of origination of information that is to be conveyed to a remotely located optical receiver. Separate optic fibers carry each of the two beams to the remote location where the information is recovered by an optical receiver from the two separate light beams.

In a further implementation, the apparatus includes means for producing three separate light beams from a single light beam where each of the three beams is polarization diverse from the other beams. Three separate optic fibers carry respectively each of the three beams from the point of origination to the remote location where the information is recovered by an optical receiver from the three separate light beams.

Another implementation of the invention encompasses an exemplary method. The method includes generating, at or adjacent the point of origination of information to be conveyed to a remotely located optical receiver, at least two light beams that are polarization diverse to each other that each carries a representation of the same information. These two light beams may be converted into two single mode type light beams. Separate optic fibers transmit the single mode light beams to the remote location where an optical receiver selects one of the light beams for decoding the signal information.

DESCRIPTION OF THE DRAWINGS

Features of exemplary implementations of the invention will become apparent from the description, the claims, and the accompanying drawings in which:

DETAILED DESCRIPTION

An aspect of the present invention resides in the recognition of the mechanism by which polarization noise occurs and in appreciating an energy transfer characteristic of a light beam carried by an optical fiber as a function of polarization changes. Although polarization diversity detection has been employed within known optic receivers, polarization noise caused by vibration of the optic fiber has provided an adverse impact in being able to accurately decode the transmitted signal. In considering this problem, an inventive contribution was made when the total transmitted power of the light beam was considered from a different perspective. In traveling from the sensor output to the detector at the optical receiver, the time-dependent characteristic of the total transmitted power of the light beam should remain the same except for the overall attenuation loss. This principle applies even in the presence of undesired polarization changes due to cable vibration. Thus, a single light detector, e.g. a photodiode, at the optical receiver which collects all of the light from a single cable should reflect the time-dependent power characteristic of the light beam with or without undesired polarization changes. Therefore, generating polarization diverse signals at or adjacent the signal source and transmitting the polarization diverse light beams on separate optic fibers, even if these fibers are subjected to vibrations causing undesired polarization changes, can be decoded by separate detectors at the optical receiver with minimized interference due to polarization noise.

Figure 2:
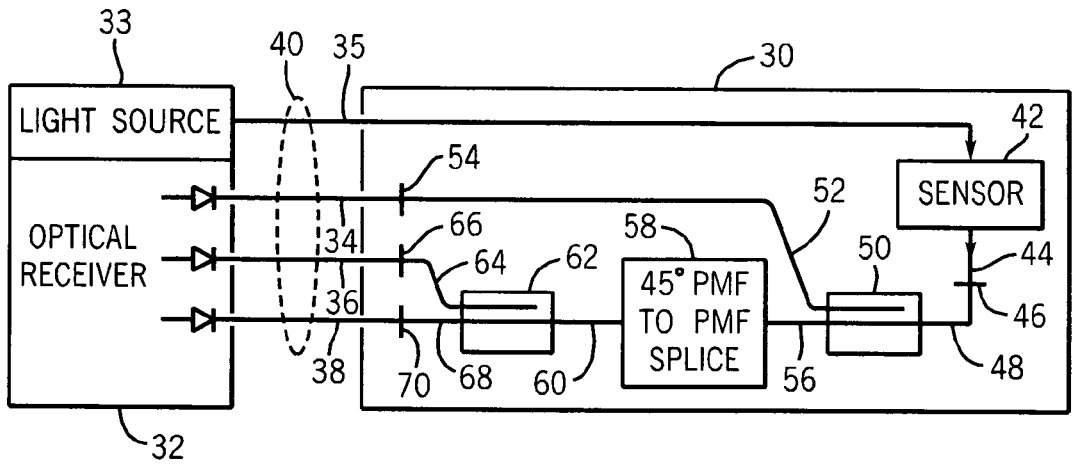
FIG. 2 is a representation of one implementation of an apparatus in accordance with the present invention in which three light beams with polarization diversity are carried by respective optic fibers through a portion of the environment that subjects the fibers to vibration.

FIG. 2 illustrates an embodiment of the present invention in which a sensor system 30 transmits information by light beams carried by corresponding optical fibers to optical receiver 32. This embodiment is especially, but not exclusively, suited for the transmission of information returned by acoustic sensors, e.g. interferometers, on a towed sensor array where the system 30 is on the towed sensor array and optical receiver 32 is on a watercraft that tows the array. The optical fibers 34, 36 and 38 carry polarization diverse light beams transmitted from system 30 to corresponding detectors in the optical receiver 32. These optical fibers experience substantial physical vibration, e.g. towed cable strum, in region 40 of the optical fibers extending between the watercraft carrying optical receiver 32 and the signal origination system 30 on the towed sensor array. A light source 33, a laser, transmits a light beam carried by fiber 35 that serves as the input to sensors 42. The fibers passing through region 40 may be part of one cable.

The sensor 42 which may comprise an acoustic sensor, e.g. a Mach-Zehnder interferometer, provides an output signal as a light beam carried by a single mode fiber 44. A splice 46 converts the light beam from a single mode fiber type (SMF) to a polarization maintained fiber type (PMF). The output light beam from splice 46 is carried by PMF 48 to a polarization maintaining beam splitter 50, which may comprise a fiber optic implementation available from Canadian Instrumentation and Research, that splits the incoming beam into two beams. One output beam from splitter 50 is carried by PMF 52 to splice 54 that converts the light beam from PMF type to SMF type. The other output beam from splitter 50 is passed by PMF 56 to a 45° PMF to PMF splice 58, which provides a 45° rotation of the polarization eignmstates. This beam is carried by PMF 60 to polarization maintaining beam splitter 62, which may comprise a fiber optic implementation available from Canadian Instrumentation and Research that splits the incoming beam into two PMF beams. One output beam from splitter 62 is carried by PMF 64 to the PMF to SMF splice 66. The other output beam from splitter 62 is carried by PMF 68 to PMF to SMF splice 70. Splices 54, 66 and 70 provide output light beams of a single mode type suited for being economically carried by separate SMFs 34, 36 and 38, respectively. Although a conversion is shown from PMF to SMF at these three splices, PMF fiber could be used to carry the light beams to the optical receiver. These three SMFs each carry a representation of the same instance (same time frame) of an output signal from sensor 42 and traverse region 40 which subjects the fibers to vibration. The light beams carried by these three fibers are terminated respectively at optical receiver 32 containing three separate photodiode detectors coupled respectively to each SMF.

For this embodiment, the PM fibers 56 and 60 along with a 45° PMF to PMF splice 58 are needed between splitter 50 and 62. It is not necessary to use PMF for fibers 52, 64 and 68 assuming that PMF fibers are not needed in order for the associated splitters 50 and 62 to work as described.

The following values and parameters can be utilized in the exemplary embodiment as shown in FIG. 2. With respect to beam splitter 50, for light along the slow axis of the PMF 48, 67% is coupled to PMF 52 and 33% is coupled by PMF 56. For light along the fast axis of PMF 48, 100% is transmitted to PMF 56. With respect to the light beam on PMF 60, 100% of the fast axis light is coupled by beam splitter 62 to PMF 68, and 100% of the slow axis light is coupled to PMF 64. As an alternative to using a separate 45° PMF to PMF splice 58 and splitter 62 with characteristics as described, a single device combining both functions, such as available from JDS Uniphase Corporation, could be used.

Figure 3:
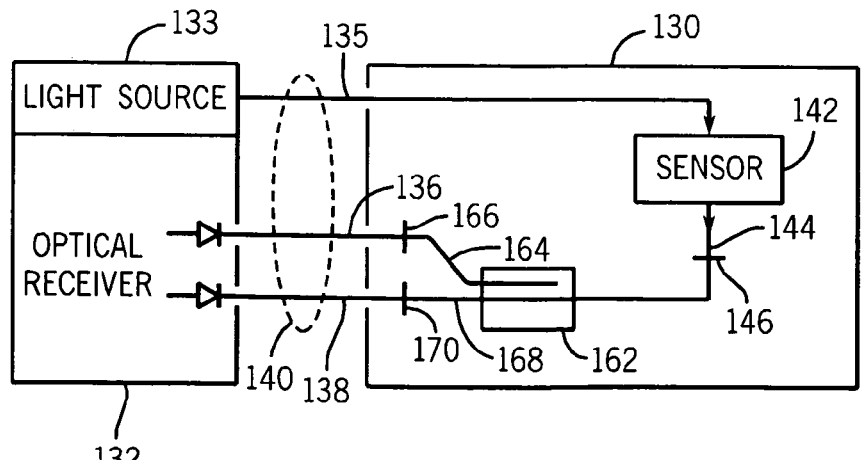
FIG. 3 is a representation of another implementation of an apparatus in accordance with the present invention in which two light beams with polarization diversity are carried by respective optic fibers through a portion of the environment that subjects the fibers to vibration.

FIG. 3 represents a further embodiment in which sensor system 130 transmits information by light beams carried by corresponding optical fibers 136 and 138 to optical receiver 132. Since this embodiment has substantial similarities to the embodiment explained with regard to FIG. 2, only differences will be addressed. It will be understood that elements in FIG. 3 that correspond with like elements in FIG. 2 are numbered by adding "100" to the reference numeral of the corresponding element in FIG. 2. Basically, the 45° PMF to PMF splice 58 of the embodiment of FIG. 2 is omitted from this embodiment. Although this embodiment provides advantages with regard to polarization diversity and minimization of polarization noise at the optical receiver, this embodiment has a small probability that an acceptable signal will not be present on one of fibers 136 and 138. In this embodiment there exists a small chance, i.e. about 0.8%, that the output light beams carried by fibers 136 or 138 will have a smaller amplitude than the minimum amplitude of a signal recovered by the embodiment using three beams and three fibers, i.e. FIG. 2. The embodiment of FIG. 2 has 100% probability that at least one of the three of the output light beams received by the optical receiver will not be orthogonal or crossed, e.g. at least one of the three will have an acceptable signal. Splitter 162 functions as described for splitter 62. Fibers 164, 168 and the input fiber to splitter 162 need not be PMF except if needed for splitter 162 to function as required.

Figure 4:
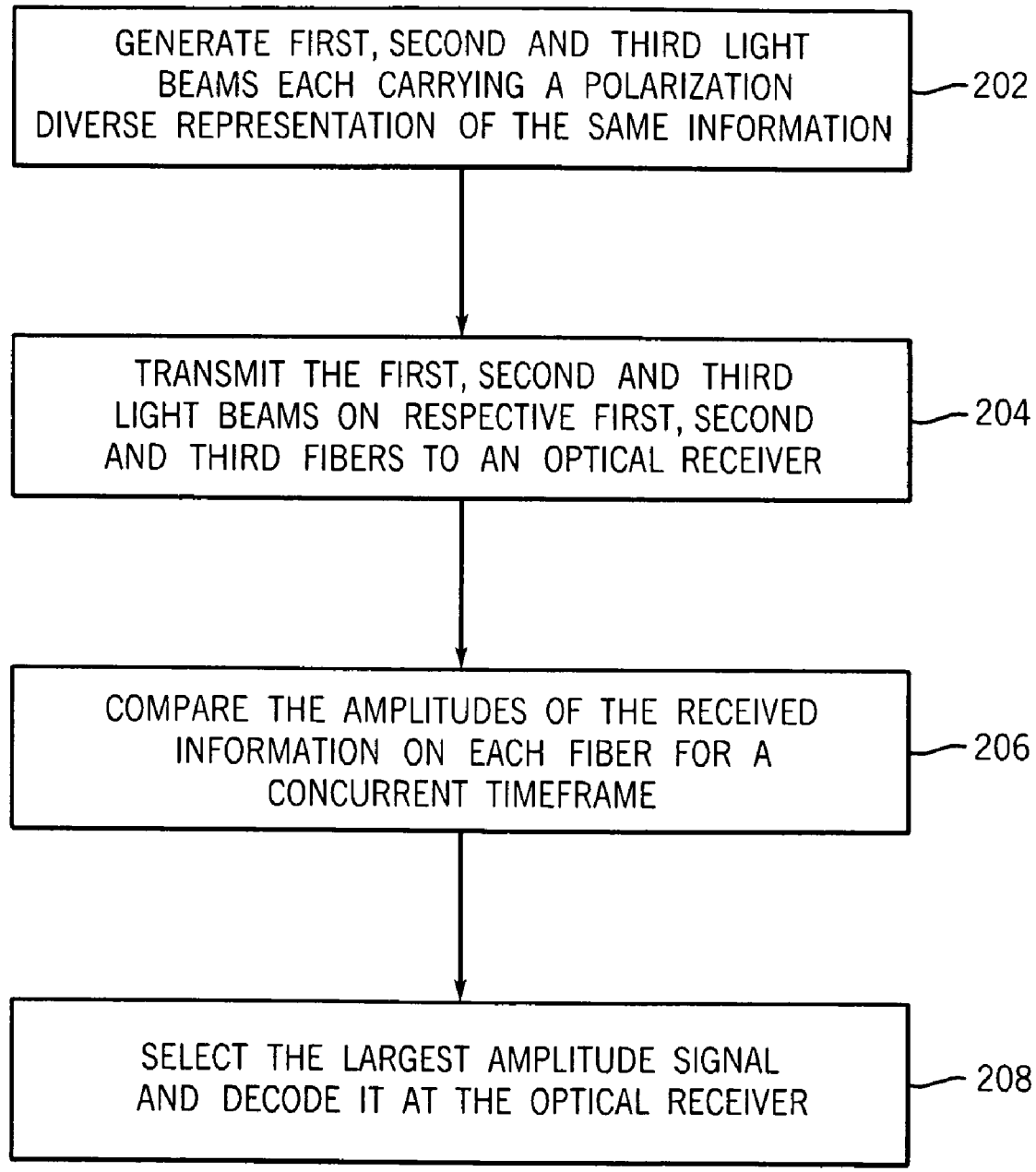
FIG. 4 is an exemplary method in accordance with the present invention.

FIG. 4 illustrates a method in accordance with an embodiment of the present invention in which three optical fibers are utilized to transmit polarization diverse representations of a signal to an optical receiver. It will be understood that this method can also apply where only two optical fibers are utilized by eliminating reference to a third fiber/light beam. In step 202 first, second and third light beams are generated at a site remote from the optic receiver where each carries a polarization diverse representation of the same information. In step 204 the first, second and third light beams are transmitted on respective first, second and third fibers to an optical receiver. In order to minimize the signal detection problems encountered due to the presence of polarization noise such as caused by physical vibration of an optical fiber carrying a light beam, the polarization diverse signals are carried by separate fibers at least through the region experiencing vibration. In step 206 the amplitudes of the received information on each fiber are compared for a concurrent time frame. In step 208 the largest amplitude signal or best quality signal is selected and decoded at the optical receiver in order to recover the encoded information carried by the light beam. The fibers carrying the respective light beams can be single mode fibers.

DETAILED ANALYSIS

Figure 1:
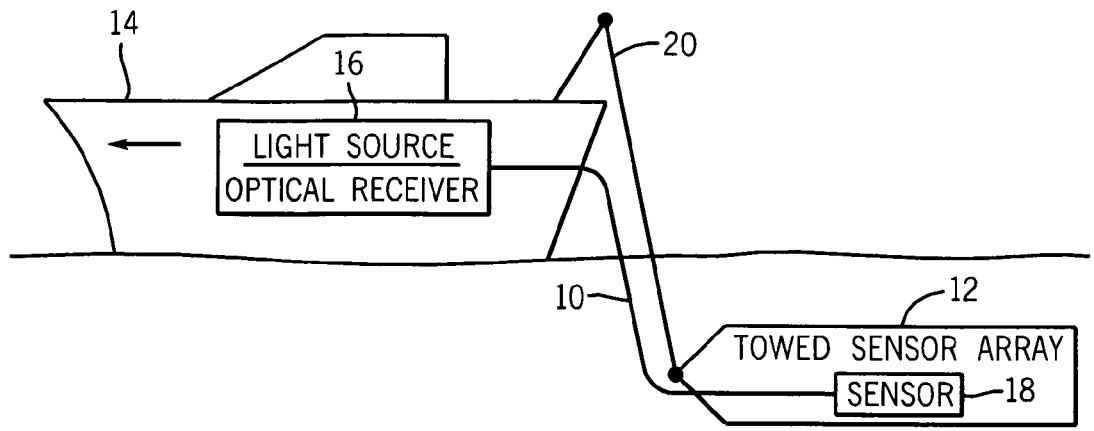
FIG. 1 shows a known system in which an optic cable is subject to a vibration inducing environment.

A detailed analysis of the signals generated by origination system 30 follows and concludes with equations that describe the useful beat signals presented to the optical receiver for each fiber. This example assumes that the sensor 42 is a Mach-Zehnder interferometer having a basic structure such as described in FIG. 1 of U.S. Pat. No. 5,448,058. As shown in FIG. 2 of the present embodiment, the "return lead" of the interferometer, which carries the useful signal information of the two interfering light beams, consists of fiber 44.

Two elliptically polarized fields representing light from the two legs of a fiber optic sensor, e.g. a Mach-Zehnder interferometer, are incident on beamsplitter 50. In their principal axis coordinate systems, they are:

$$A = \begin{pmatrix} \cos(\alpha) \\ i^*\sin(\alpha) \end{pmatrix} \quad \text{(Eq. 1)}$$

$$B = \begin{pmatrix} \cos(\beta) \\ i^*\sin(\beta) \end{pmatrix}$$

Angles $\alpha$ and $\beta$ range from $-45°$ to $+45°$. The tangent of the angle gives the ratio of the minor to major axis. The absolute values of $\alpha$ and $\beta$ are $45°$ for right and left circularly polarized light and zero for linearly polarized light.

The following rotation matrices are used to express the fields in a common coordinate system along the fast and slow axes of the PM fiber.

$$Rot(x) = \begin{pmatrix} \cos(x) & \sin(x) \\ -\sin(x) & \cos(x) \end{pmatrix} \quad \text{(Eq. 2)}$$

$$Rot(y) = \begin{pmatrix} \cos(y) & \sin(y) \\ -\sin(y) & \cos(y) \end{pmatrix}$$

Rotation angles are x for field A and y for field B. They range from zero to $180°$. The fields in the new coordinate system are:

$$A(x) = Rot(x) \cdot A \quad B(y) = Rot(y) \cdot B \quad \text{(Eq. 3)}$$

At beamsplitter 50, the power reflection and transmission coefficients for fast and slow axes are:

$$R_f = 0 \; T_f = 1.00 \; R_s = 0.667 \; T_s = 0.333 \quad \text{(Eq. 4)}$$

Reflection and transmission matrices of field amplitudes A and B at beamsplitter 50 are given by equations 5-1 and 5-2:

$$R1 = \begin{pmatrix} \sqrt{R_s} \cdot \exp(i \cdot \theta_0) & 0 \\ 0 & \sqrt{R_f} \cdot \exp(i \cdot \theta_1) \end{pmatrix} \quad \text{(Eq. 5-1)}$$

$$T1 = \begin{pmatrix} \sqrt{T_s} \cdot \exp(i \cdot \theta_2) & 0 \\ 0 & \sqrt{T_f} \cdot \exp(i \cdot \theta_3) \end{pmatrix} \quad \text{(Eq. 5-2)}$$

Arbitrary phase factors $\theta_0$, $\theta_1$, $\theta_2$ and $\theta_3$ represent propagation of the light down the fast and slow axes of the PM fibers after the beam splitting operations.

After beamsplitter 50, the 45° rotation at the 45° PMF to PMF splice 58 is represented by a 45° rotation matrix ($Rot_{45}$) and the beam separation of beamsplitter 62 is given by two polarization matrices (P2 in the x axis and P3 in the y axis) in the 45° angle rotated coordinate system as:

$$Rot_{45} = \begin{pmatrix} \cos(45°) & \sin(45°) \\ -\sin(45°) & \cos(45°) \end{pmatrix} \quad \text{(Eq. 6)}$$

$$P2 = \begin{pmatrix} 1 & 0 \\ 0 & 0 \end{pmatrix}$$

$$P3 = \begin{pmatrix} 0 & 0 \\ 0 & 1 \end{pmatrix}$$

Transmission matrices of equation 7 represent the propagation of light from the input of beamsplitter 50 to the two outputs of beamsplitter 62. They are products of the matrices in equations 5 and 6.

$$T2 = P2 * Rot_{45} * T1 \quad T3 = P3 * Rot_{45} * T1 \quad \text{(Eq. 7)}$$

Propagation matrices R1, T2 and T3 characterized light propagation from the input of beamsplitter 50 to the output fibers 34, 38 and 36, respectively. The transformed fields A and B at fibers 34, 38 and 36 are given by equations 8-1 and 8-2:

$$A1(x) = R1 * A(x) \quad A2(x) = T2 * A(x) \quad A3(x) = T3 * A(x) \quad \text{(Eq. 8-1)}$$

$$B1(y) = R1 * B(y) \quad B2(y) = T2 * B(y) \quad B3(y) = T3 * B(y) \quad \text{(Eq. 8-2)}$$

The useful beat signals presented to the optical receiver are products of fields A and B at fibers 34, 38 and 36, respectively. The respective magnitudes are:

$$H1(x,y) = |A1(x) * \overline{B1(y)}| \; H2(x,y) = |A2(x) * \overline{B2(y)}|$$
$$H3(x,y) = |A3(x) * \overline{B3(y)}| \quad \text{(Eq. 9)}$$

The bar above portions of factors in equation 9 represents the complex conjugate of the factor. In practice, the maximum beat signal among the three signals presented by fibers 34, 38 and 36 is used for signal recovery by the polarization diversity receiver.

Using the above equations, an empirical study was made to identify the worst case (minimum magnitude) for the maximum available signal. Rotation angles of x and y from zero to 180° for the input fields of A and B were considered. Elliptical polarization angles $\alpha$ and $\beta$ as well as arbitrary phase factors $\theta_0$, $\theta_1$, $\theta_2$ and $\theta_3$ were utilized as adjustable parameters. By varying angles $\alpha$, $\beta$, x and y in a systematic way as well as by varying phase factors $\theta_0$, $\theta_1$, $\theta_2$ and $\theta_3$ the lowest possible maximum beat signal was obtained. The results of the study found a minimum of the maximum beat signal of 0.25 and a maximum beat signal of 0.667. These values are based on a reference of 1.0 representing the maximum beat signal obtained by a single photodiode at the optical receiver without any polarization masks.

For the embodiment of the present invention as shown in FIG. 3 that utilizes two instead of three optic fibers carrying polarization diverse signals, this system still offers advantages in overcoming polarization noise but has a small chance that a usable signal will not be present on either fiber. For the worst case of the minimum value of the maximum beat signal presented by fibers 136 and 138 to the optical receiver 132, the signal can go to zero. It was determined that a probability of 0.8% exists that an output beat signal presented by fiber 136 or 138 would be less than the minimum amplitude of 0.25 provided by the embodiment described in FIG. 2. The embodiment described in FIG. 3 does provide an improvement in minimizing polarization noise due to tow cable strum. Problems arising from polarization noise due to vibrations of all types, i.e. periodic, aperiodic and random vibrations, are all minimized by the techniques of the present invention.

Various modifications and additions can be made to the illustrative embodiments. For example, more than three light beams carried by more than three optic fibers could be used. Although polarization noise is minimized by using polarization diverse signals carried by separate fibers in the illustrative embodiments between the entirely of the path from origination to optical receiver, only using this technique in the region of vibration is required. Thus, it is not necessary that separate fibers with separate polarization diverse light beams be used for the whole path. For example, the polarization diverse signals could be generated just prior to entry into the region of vibration, as opposed to being generated at or adjacent the origination signal source. Various types of optic and fiber devices can be used to produce polarization diverse light beams.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus for recovering optical signals carried by optical cables that have at least one region intermediate a signal encoding source and an optical receiver, the apparatus comprising:

light transmission source disposed on a watercraft;

towed sensor array, designed to be towed under water behind the watercraft, contains a signal encoding source;

optical cable connecting the light transmission source and signal encoding source where the optical cable transmits a source of light from the light transmission source to the signal encoding source;

the signal encoding source generating, based on the light received from the light transmission source, first and second light beams each carrying a representation of the same information where the second light beam has a polarization that is substantially different from the first light beam;

the optical receiver disposed on the watercraft;

first and second optical fibers that pass through the at least one region and are connected to the optical receiver and signal encoding source where the first and second optical fibers transmit the first and second light beams respectively from the signal encoding source to the optical receiver, the first and second fibers subjected to physical vibration in the at least one region that is due to tow cable strum causing undesired polarization changes in the first and second light beams;

the optical receiver detecting information carried by the first and second light beams, the optical receiver including means for minimizing degradation of signals corresponding to the first and second light beams due to the undesired polarization changes caused by tow cable strum vibration of the first and second optic fibers, the means for minimizing including means for selecting the one of the first and second light beams having the largest corresponding signal amplitude and means for decoding the transmitted information based on the selected one.

2. The apparatus of claim 1 further comprising:

third optical fiber connected to the optical receiver and signal encoding source where the third optical fiber transmits a third light beam from the signal encoding source to the optical receiver, the third fiber subjected to said physical vibration that is due to tow cable strum;

the signal encoding source generating, based on the light received from the light transmission source, a third light beam that carries a polarization diverse representation of the same information carried by the polarization diverse first and second light beams, the third optical fiber subjected to said physical vibration, the optical receiver including means for minimizing degradation of signals corresponding to the first, second and third light beams due to the undesired polarization changes caused by tow cable strum vibration of the first, second and third optic fibers, the means for minimizing including means for selecting the one of the first, second and third light beams having the largest corresponding signal amplitude and means for decoding the transmitted information based on the selected one.

3. The apparatus of claim 1 further comprising:

the optical receiver independently decoding the first and second light beams carried by the first and second optical fibers and comparing the results of the decoded first and second light beams at concurrent time intervals and selecting the largest amplitude result from which to decode the transmitted signal information.

4. The apparatus of claim 2 further comprising:

the optical receiver independently decoding the first, second and third light beams carried respectively by the first, second and third optical fibers, comparing the results of the decoded first, second and third light beams at concurrent time intervals, and selecting the one of the results with the largest amplitude from which to decode to determine the transmitted signal information.

5. The apparatus of claim 2 further comprising:

the optical encoding signal source receiving an initial light beam and encoding signal information onto the initial light beam, the optical encoding signal source transforming the initial single mode light beam from a single mode light beam into a polarization maintained light beam being suited for the converting.

6. The apparatus of claim 5 further comprising:

the optical encoding signal source splitting the first light beam into the second and third output polarization maintained light beams where the second beam has a polarization that is substantially different from the polarization of the third beam;

the optical encoding signal source transmitting the second and third light beams to the optical receiver.

* * * * *